(12) United States Patent  
Arlt et al.

(10) Patent No.: US 7,726,290 B2
(45) Date of Patent: Jun. 1, 2010

(54) METHOD AND DEVICE FOR OPERATING AN INTERNAL COMBUSTION ENGINE

(75) Inventors: Tino Arlt, Regensburg (DE); Gerd Rösel, Regensburg (DE); Norbert Sieber, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 92 days.

(21) Appl. No.: 12/280,935

(22) PCT Filed: Jan. 31, 2007

(86) PCT No.: PCT/EP2007/050953

§ 371 (c)(1),
(2), (4) Date: Aug. 27, 2008

(87) PCT Pub. No.: WO2007/099013

PCT Pub. Date: Sep. 7, 2007

(65) Prior Publication Data

US 2009/0038595 A1  Feb. 12, 2009

(30) Foreign Application Priority Data

Feb. 28, 2006  (DE) ................. 10 2006 009 241

(51) Int. Cl.
*F02D 41/26*  (2006.01)

(52) U.S. Cl. ............... 123/697; 60/285; 73/114.72; 701/106

(58) Field of Classification Search ........... 701/109, 701/106; 123/672, 676, 689, 697; 60/285; 73/114.69, 114.72

See application file for complete search history.

(56) References Cited

U.S. PATENT DOCUMENTS

| 6,715,287 | B1 | 4/2004 | Engel et al. |
| 6,952,639 | B2* | 10/2005 | Kumar et al. ............. 701/100 |
| 6,952,640 | B2 | 10/2005 | Bleile et al. |
| 7,065,960 | B2* | 6/2006 | Gioannini et al. ......... 60/295 |
| 2007/0186541 | A1 | 8/2007 | Haft ........................ 60/285 |
| 2009/0188235 | A1* | 7/2009 | Robel et al. .............. 60/276 |

FOREIGN PATENT DOCUMENTS

| DE | 4339692 | | 11/1993 |
| DE | 19963358 | A1 | 7/2001 |
| DE | 10219797 | | 5/2002 |
| DE | 10312387 | A1 | 10/2004 |
| DE | 10 2004 033 394 | B3 | 12/2005 |
| EP | 1 091 108 | A1 | 4/2001 |
| FR | 2 771 815 | A1 | 2/1997 |
| JP | 60 164241 | A1 | 8/1985 |

OTHER PUBLICATIONS

German Office Action, German application No. 10 2006 009 241.4-26, 3 pages, Apr. 30, 2009.

* cited by examiner

*Primary Examiner*—Hai H Huynh
(74) *Attorney, Agent, or Firm*—King & Spalding L.L.P.

(57) ABSTRACT

An internal combustion engine has at least one cylinder and an exhaust gas tract, in which an exhaust gas sensor, that can be heated in a controlled manner, is arranged. An exhaust gas temperature of an exhaust gas flowing in the exhaust gas tract is determined as a function of the heating power (P_HEAT) supplied to the exhaust gas sensor. An estimated value of the exhaust gas temperature is determined as a function of a physical model of the combustion of the air/fuel mixture and of the exhaust gas tract as a function of at least one operating variable of the internal combustion engine, but independent of the heating power supplied to the exhaust gas sensor. Model parameters of the physical model are adapted as a function of a deviation of the estimated value and of the exhaust gas temperature determined by the supplied heating power.

12 Claims, 3 Drawing Sheets

METHOD AND DEVICE FOR OPERATING AN INTERNAL COMBUSTION ENGINE

CROSS-REFERENCE TO RELATED APPLICATIONS

This application is a U.S. national stage application of International Application No. PCT/EP2007/050953 filed Jan. 31, 2007, which designates the United States of America, and claims priority to German application number 10 2006 009 241.4 filed Feb. 28, 2006, the contents of which are hereby incorporated by reference in their entirety.

TECHNICAL FIELD

The invention relates to a method and a device for operating an internal combustion engine with at least one cylinder and one exhaust gas tract, which is equipped with an exhaust gas sensor that can be heated in a controlled manner.

BACKGROUND

Ever stricter legal regulations regarding the permissible pollutant emissions from vehicles equipped with internal combustion engines make it necessary to minimize the pollutant emissions, at least within specified operating ranges of the internal combustion engine. One way of achieving this is to reduce the pollutant emissions which are generated during the combustion of the air/fuel mixture in the particular cylinder of the internal combustion engine. Another method is the use of emission control systems in internal combustion engines which convert the pollutant emissions produced during the combustion process of the air/fuel mixture in the particular cylinders into harmless substances. Catalytic converters which can convert the carbon monoxide, hydrocarbons and nitrogen oxides into harmless substances are used for this purpose.

A precondition for a long-term good conversion capability of catalytic converters is that no overheating of the catalytic converters takes place. For this reason, it is necessary, particularly in operating areas of the internal combustion engine in which very high performance is to be provided by the internal combustion engine, to take measures as appropriate to protect against overheating of the catalytic converter. For this purpose, a determination of the exhaust gas temperature and/or the component temperature of the catalytic converter which is as accurate as possible is desirable.

From DE 10 2004 033 394 B3, an engine control unit is known which sets an exhaust gas temperature by means of the air/fuel mixture and which includes a temperature model that calculates the temperature for a component to be protected in the exhaust gas tract. By means of the temperature model, a set temperature, which is maintained for a long period provided the current operating and driving conditions are maintained, is determined for the component arranged in the exhaust gas tract. The set temperature is the component temperature, which is established during continuous operation of the component to be protected. To protect the component, the engine control unit controls the exhaust gas temperature as a function of the set temperature.

SUMMARY

A method and a device can be provided, which are simple and reliable, for operating an internal combustion engine.

According to an embodiment, a method for operating an internal combustion engine with at least one cylinder and an exhaust gas tract, in which an exhaust gas sensor, which can be heated in a controlled manner, is arranged, may comprise the steps of: determining an exhaust gas temperature of an exhaust gas flowing in the exhaust gas tract as a function of the heating power supplied to the exhaust gas sensor, determining an estimated value of the exhaust gas temperature as a function of a physical model of the combustion of the air/fuel mixture and of the exhaust gas tract as a function of at least one operating variable of the internal combustion engine, but independent of the heating power supplied to the exhaust gas sensor, and adapting model parameters of the physical model as a function of a deviation of the estimated value and of the exhaust gas temperature determined by means of the supplied heating power.

According to another embodiment, a device for operating an internal combustion engine with at least one cylinder and one exhaust gas tract, in which an exhaust gas sensor, which can be heated in a controlled manner, can be arranged, with the device being operable: —to determine an exhaust gas temperature of an exhaust gas flowing in the exhaust gas tract as a function of the heating power supplied to the exhaust gas sensor, —to determine an estimated value of the exhaust gas temperature as a function of a physical model of the combustion of the air/fuel mixture and of the exhaust gas tract as a function of at least one operating variable of the internal combustion engine, but independent of the heating power supplied to the exhaust gas sensor, and—to adapt model parameters of the physical model as a function of a deviation of the estimated value and of the exhaust gas temperature determined by means of the supplied heating power.

According to a further embodiment, the exhaust gas temperature of the exhaust gas flowing in the exhaust gas tract can be determined as a function of a mass flow flowing through the exhaust gas tract. According to a further embodiment, the exhaust gas temperature of the exhaust gas flowing in the exhaust gas tract can be determined in a virtual steady operating state as a function of the heating power supplied to the exhaust gas sensor. According to a further embodiment, a protective function for a component of the exhaust gas tract may be implemented as a function of the exhaust gas temperature determined by means of the supplied heating power.

BRIEF DESCRIPTION OF THE DRAWINGS

Exemplary embodiments of the invention are described in more detail in the following with the aid of schematic drawings.

The drawings are as follows.

Elements of similar construction or function are given the same reference characters in the different drawings.

DETAILED DESCRIPTION

Figure 1:
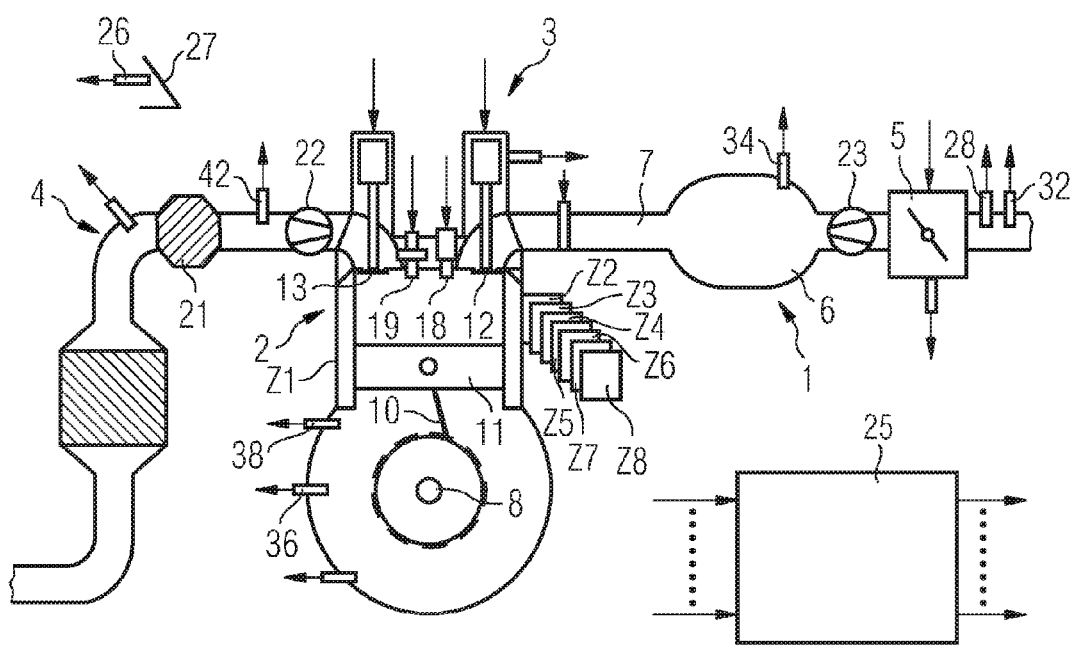
FIG. 1 An internal combustion engine

According to various embodiments of a method and a corresponding device for operating an internal combustion engine with at least one cylinder and an exhaust gas tract, which is equipped with an exhaust gas sensor that can be heated in a controlled manner, an exhaust gas temperature of an exhaust gas that flows in the exhaust gas tract is determined in accordance with the heating power supplied to the exhaust gas sensor.

According to various embodiments, it is thus makes use of the knowledge that exhaust gas sensors usually include a heating device which heats the exhaust gas sensor, in a controlled manner, to a predetermined set value of an exhaust gas sensor temperature during the operation of the exhaust gas sensor. The heating power supplied to the exhaust gas sensor is therefore a measure of the exhaust gas temperature of the exhaust gas flowing in the exhaust gas tract. An estimated value of the exhaust gas temperature is determined as a function of a physical model of the combustion of the air/fuel mixture and of the exhaust gas tract as a function of at least one operating variable of the internal combustion engine, but independent of the heating power supplied to the exhaust gas sensor. Model parameters of the physical model are adapted as a function of a deviation of the estimated value and of the exhaust gas temperature determined by means of the supplied heating power. In this way, the exhaust gas temperature can be determined with sufficient accuracy without using an additional temperature sensor and possible inaccuracies in the physical model can be compensated for. This can be done particularly precisely if the determination of the estimated value of the exhaust gas temperature and of the exhaust gas temperature determined by means of the supplied heating power takes place in the virtual steady operating state.

According to an embodiment, the exhaust gas temperature of the exhaust gas flowing in the exhaust gas tract is determined as a function of a mass flow flowing through the exhaust gas tract. In this way, the exhaust gas temperature can be determined particularly precisely.

According to a further embodiment, the exhaust gas temperature of the exhaust gas flowing in the exhaust gas tract is determined in a virtual steady operating state as a function of the heating power supplied to the exhaust gas sensor. The exhaust gas temperature can be determined with particular accuracy in this way because in a virtual steady operating state an almost constant heating power is supplied to the exhaust gas sensor and a control deviation with a controlled heating of the exhaust gas sensor is very low.

According to a further embodiment, a performance of a protective function for a component of the exhaust gas tract takes place as a function of the exhaust gas temperature determined by means of the supplied heating power. A component of this kind can, for example, be a catalytic converter arranged in the exhaust gas tract. However, it can also be any other component of the exhaust gas tract.

An internal combustion engine (FIG. 1) includes an induction tract 1, and engine block 2, a cylinder head 3 and an exhaust gas tract 4. The induction tract 1 preferably may include a throttle valve 5, and also a manifold 6 and an induction pipe 7 which passes through a cylinder Z1 via an induction port in the engine block 2. The engine block 2 also has a crankshaft 8, which is connected by means of a connecting rod 10 to the piston 11 of the cylinder Z1.

The cylinder head 3 also includes a valve timing gear with a gas inlet valve 12 and a gas outlet valve 13.

The cylinder head 3 also includes an injection valve 18 and a spark plug 19. Alternatively, the injection valve 18 can be arranged in the induction pipe 7. The injection valve 18 is part of an injection system, which also includes a fuel supply device and a control for the injection valve 18, and preferably also a fuel pump. The spark plug 19 is part of an ignition system, which also includes a control for the spark plug 19.

A catalytic converter 21, which may be preferably designed as a three-way catalytic converter, is arranged in the exhaust gas tract 4. The catalytic converter 21 can additionally, or alternatively, be designed as an $NO_x$ catalytic converter.

It may also be preferred if a turbine 22 of an exhaust gas turbocharger, which drives a compressor 23 in the induction tract 1, is arranged in the exhaust gas tract. Furthermore, a secondary-air injection device (not illustrated) is also present, by means of which the fresh air can be introduced into the exhaust gas tract 4.

The internal combustion engine includes several cylinders Z1-Z8, which can be divided into several groups to each of which a separate exhaust gas tract can be assigned as necessary.

A control device 25 is provided, to which sensors are assigned which detect various measured variables and determine the value of the measured variable in each case. In addition to the measured variables, operating variables include also the variables derived from these. The control device 25 determines correcting variables depending on at least one of the measured variables, which are then converted into one or more correcting signals for control of the correcting elements by means of corresponding servodrives. The control device 25 can also be referred to as a device for controlling the internal combustion engine or as a device for operating the internal combustion engine.

The sensors are a pedal position sensor 26, which detects a gas pedal position of a gas pedal 27, an air mass sensor 28 which detects an air mass flow upstream of the throttle valve 5, a first temperature sensor 32 which detects an induction air temperature TIA, an induction pipe pressure sensor 34 which detects an induction pipe pressure in the manifold 6, a crankshaft angle sensor 36 which detects a crankshaft angle, which is then assigned a speed N, and a second temperature sensor 38 which detects a coolant temperature TCO.

Furthermore, an exhaust gas probe 42, which can be heated in a controlled manner, is provided. It may be preferably arranged upstream of the catalytic converter 21 or in the catalytic converter 21 and preferably may detect a residual oxygen content of the exhaust gas. The measured signal in this case is characteristic of the air/fuel ratio in the combustion chamber or in the associated cylinder(s) Z1-Z8 and downstream of the exhaust gas probe 42 of the exhaust gas tract 4 before the oxidization of the fuel. The exhaust gas probe can, however, also be suitable for detecting any other gas components such as $NO_x$.

Depending on the embodiment, any subset of the named sensors can be present or additional sensors can also be present.

Thus, for example, a sensor can also be provided for detecting a vehicle speed VS.

The correcting elements are, for example, the throttle valve 5, the gas inlet and gas outlet valves 12, 13, the injection valve 18, the spark plug 19 or the turbine 22.

The correcting elements and sensors are especially shown in association with cylinder Z1 in FIG. 1. Corresponding correcting elements and/or sensors may be also preferably assigned to the other cylinders. An injection valve 18 and a spark plug 19 may thus be preferably assigned to each cylinder.

Figure 2:
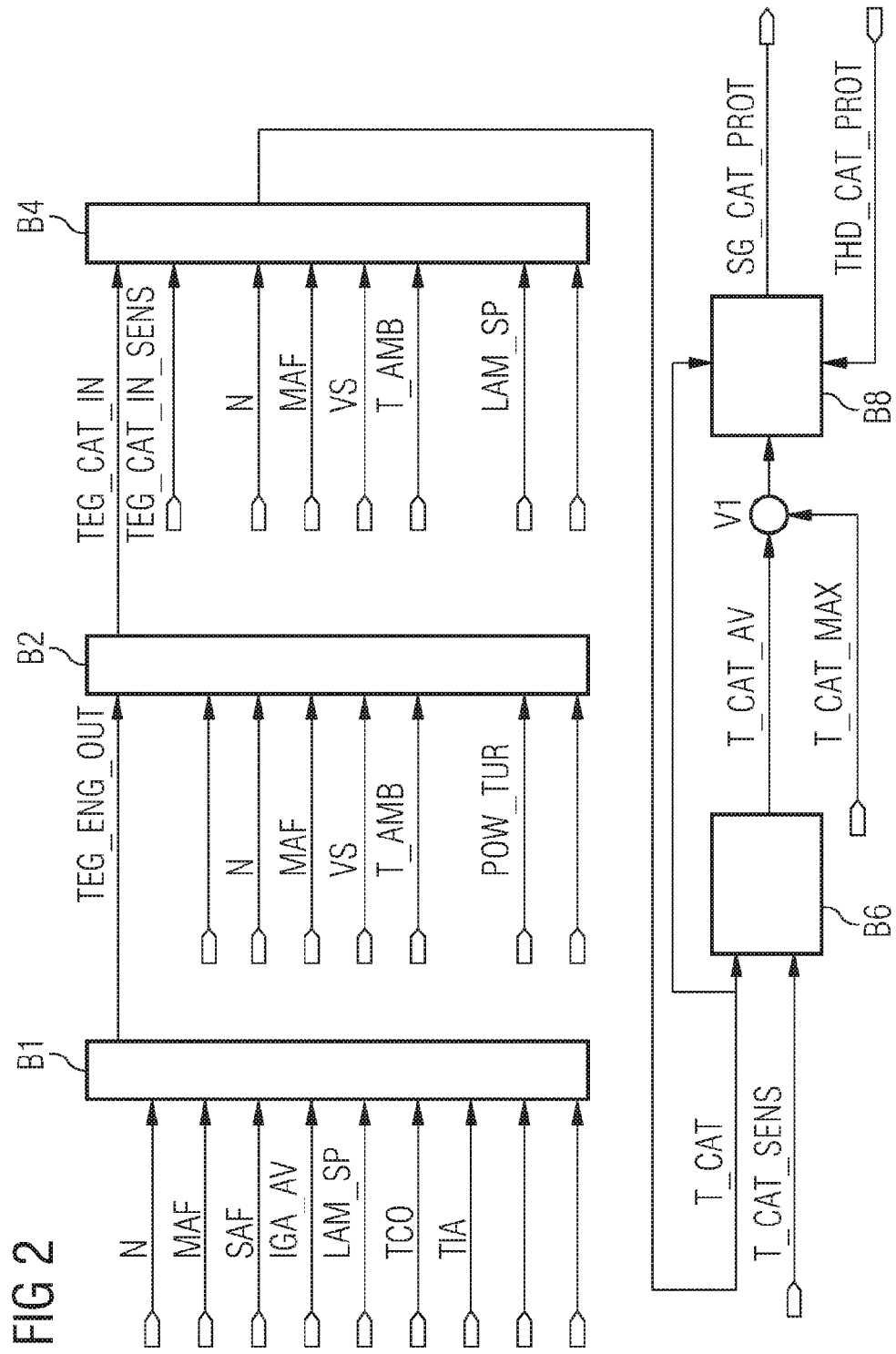
FIG. 2 A first block diagram showing the operation of an internal combustion engine.

The functionality of the control device with respect to determining an estimated value of the exhaust gas temperature and the protective measures derived therefrom for a component of the exhaust gas tract 4 to be protected is shown in more detail by means of the block diagram in FIG. 2. The component of the exhaust gas tract 4 to be protected may be preferably the catalytic converter 21. It can, however, also be any other component of the exhaust gas tract 4, such as the turbine 22.

The functionality of the block diagram in FIG. 2 can be preferably stored in the control device 25 in the form of programs and is run in the control device 25 during operation of the internal combustion engine.

A block B1 includes a physical model of the combustion engine up to the outlet of the combustion chamber of the respective cylinder Z1 to Z8 in the exhaust gas tract 4. The model can also be regarded as a monitor. It is designed to determine an estimated value TEG_ENG_OUT of the exhaust gas temperature during the outflow from the combustion chamber. The input variables are the speed N, the air mass flow MAF, a secondary air mass flow SAF which can be supplied via the secondary-air injection device to the exhaust gas tract 4, an actual ignition angle IGA_AV at which the ignition spark of the respective spark plug 19 is actually generated, a set air/fuel ratio LAM_SP, which preferably may be set by means of a lambda control in the respective cylinders Z1 to Z8 of the internal combustion engine, the coolant temperature TCO and the induction air temperature TIA.

The input variables of block B1 can also be a subset, or be additional to, the named operating variables. Instead of the set air/fuel ratio LAM_SP, an actual air/fuel ratio can also be an input variable of block B1, which is derived from the measured signal of the exhaust gas probe 42. Instead of the actual ignition angle IGA-AV, a set ignition angle can also be an input variable of the block B1.

A block B2 includes a further physical model, which models those parts of the exhaust gas tract from the outlet from the combustion chamber of the respective cylinder Z1 to Z8 to the input end of the catalytic converter 21, for determining an estimated value TEG_CAT_IN of the exhaust gas temperature at the inlet end of the catalytic converter 21. This model also can be regarded as a monitor of the respective section of the circuit.

The model of block B2 can also alternatively be divided into several part models, which, for example, represent a first pipe section of the exhaust gas tract from the outlet from the respective combustion chamber to the turbine, then the turbine 22 itself and finally a further pipe section from the turbine to the catalytic converter 21.

The input variables of block B2 are the estimated value TEG_ENG_OUT of the exhaust gas temperature during the outflow from the combustion chamber, the speed N, the air mass flow MAF, which basically can also include the exhaust gas component, the vehicle speed VS, an ambient temperature T_AMB and a turbine power POW_TUR of the turbine.

The vehicle speed VS can, for example, be determined depending on the speed N, the transmission ratio of a gearbox of the vehicle in which the internal combustion engine is arranged and the wheel circumferences of the wheels of the vehicle. It can, however, also be determined in a different manner known for this purpose to the person skilled in the art.

The ambient temperature T_AMB can, for example, be determined by means of a suitable ambient temperature sensor or can also be estimated depending on the induction air temperature by means of a suitable physical model. The turbine power POW_TUR can, for example, be determined by means of known maps depending on the speed N and the airmass flow MAF.

In addition to these input variables of block B2, other operating variables of the internal combustion engine can also be input variables or also only a subset of the named input variables can be input variables of block B2. The determination of the estimated value TEG_CAT_IN of the exhaust gas temperature takes place at the input of the catalytic converter 21, corresponding to the procedure when calculating the estimated value TEG_ENG_OUT of the exhaust gas temperature during the outflow from the combustion chamber in accordance with the model of block B1. By means of the model of block B2, the thermal influence of the components of the exhaust gas tract 4 located in the section from the outlet of the combustion chamber to the inlet area of the catalytic converter 21 on the exhaust gas flowing therein can be taken into account.

A block B4 includes a model, which can also be regarded as a monitor, of the catalytic converter 21 with respect to its thermal properties and is designed to determine an estimated value T-CAT of a component temperature of the catalytic converter 21 as a function of the input variables of block B4. The input variables of block B4 are the estimated value TEG_CAT_IN of the exhaust gas temperature at the inlet end of the catalytic converter 21, the speed N, the air mass flow MAF, the vehicle speed VS, the ambient temperature T_AMB and the set air/fuel ratio LAM_SP, which as a preferred correcting variable has a determining influence on the temperature of the catalytic converter 21 as part of the protective measures for protecting the catalytic converter 21. Input variables can also be a subset of the named input variables of block B4 or also additional operating variables of the internal combustion engine.

The estimated value T_CAT of the component temperature of the catalytic converter 21 is determined in a manner corresponding to the relevant procedure in block B1 with respect to determining the estimated value TEG_ENG of the exhaust gas temperature during the outflow from the combustion chamber.

A block B6 is designed to determine an actual value T_CAT_AV of the component temperature of the catalytic converter 21 and, in fact, depending on the estimated value T_CAT of the component temperature or by means of a component temperature T_CAT_SENS of the catalytic converter 21 determined by means of the heating power supplied to the exhaust gas sensor 42.

In block B6 the component temperature T_CAT_SENS, determined by means of the heating power supplied to the exhaust gas sensor, of the catalytic converter 21 can be preferably assigned to the actual value T_CAT_AV in a virtual steady operating state of the internal combustion engine. Outside the virtual steady operating state, the component temperature of the catalytic converter 21, preferably the estimated value T_CAT of the component temperature of the catalytic converter 21, can be assigned to the actual value T_CAT. Alternatively, however, either the estimated value T_CAT of the component temperature of the catalytic converter 21 or the component temperature T_CAT_SENS of the catalytic converter 21, determined by means of the heating power supplied to the exhaust gas sensor, can be assigned regardless of the operating state of the internal combustion engine.

In a connective point V1, a negative deviation is formed from a maximum value T_CAT_MAX and the actual value T_CAT_AV of the component temperature of the catalytic converter 21 and serves as an input variable to a block B8, in which a corresponding controller is formed. The controller is used to perform protective measures for the component to be protected i.e. in this example a component of the catalytic converter 21.

The controller of Block B8 is activated if an activation condition is met, which for example can be met if the actual value T_CAT_AV of the component temperature of the catalytic converter 21 exceeds a threshold value THD_CAT_PROT. The threshold value can, for example, be 920° C. The maximum value T_CAT_MAX of the component temperature of the catalytic converter 21 can, for example, be at 950° C.

The controller can be preferably designed as an I controller. The controller can, for example, be also designed as a P, PI, PID or other controller known to the person skilled in the art.

At the output end, the controller generates a component protection correcting signal SG_CAT_PROT, which, for example, can be a factor for influencing the set air/fuel ratio LAM_SP and can lead to an enrichment of the air/fuel mixture to avoid overheating of the catalytic converter 21.

Figure 3:
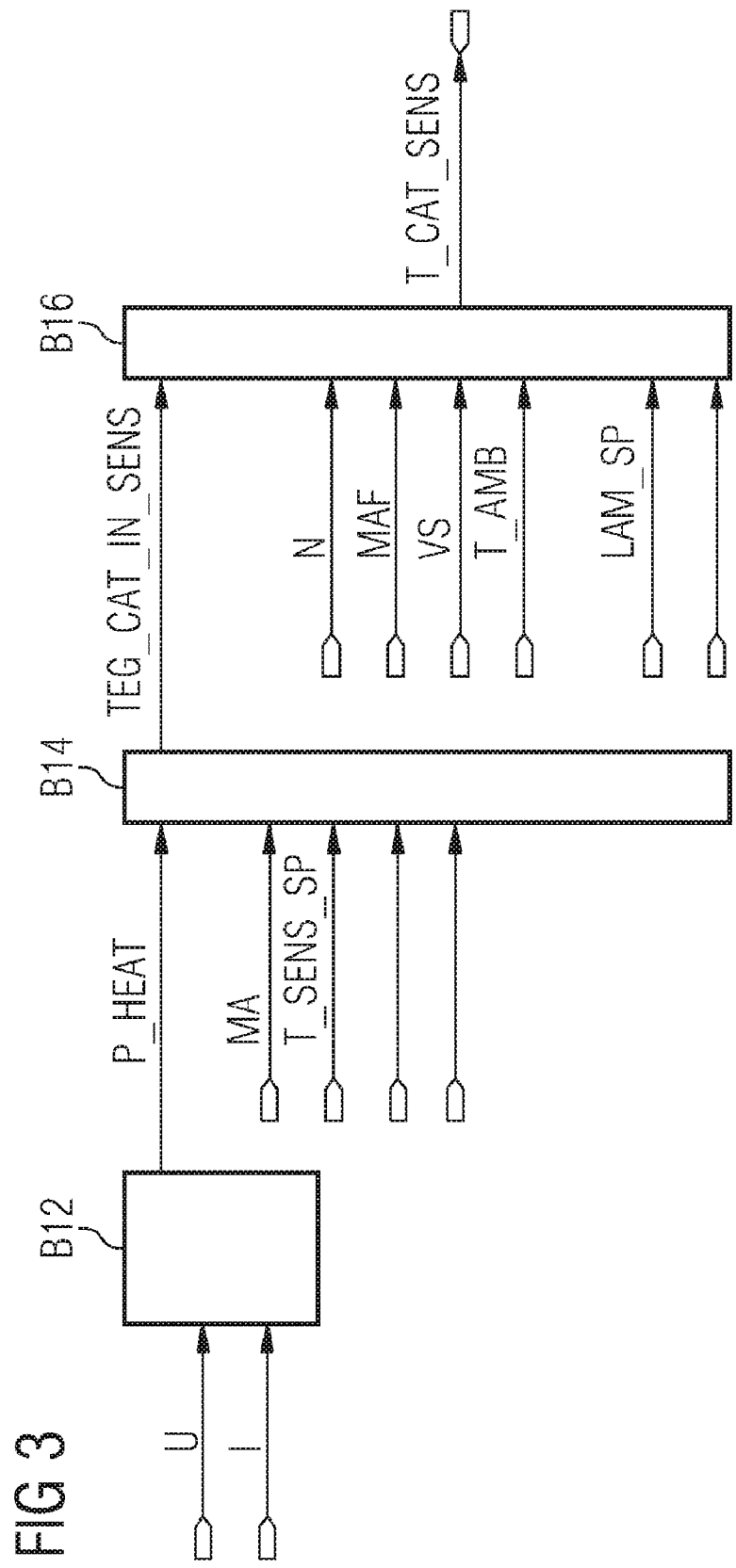
FIG. 3 A second block diagram showing the operation of the internal combustion engine.

A further block diagram, whose functionality is stored in the control device 25 in the form of a program and is run during the operation of the internal combustion engine, is explained in more detail with the aid of FIG. 3. In a block B12 a voltage and a current are acquired, which are necessary for the controlled heating of the exhaust gas sensor 42 and which are applied to the exhaust gas sensor 42. Furthermore, block B12 is designed to determine a heating power P_HEAT as a function of the voltage U and the current I, said heating power P_HEAT being supplied to the exhaust gas sensor 42.

A block B14 is designed to determine an exhaust gas temperature TEG_CET_IN_SENS at the input of the catalytic converter, by means of the heating power P_HEAT supplied to the exhaust gas sensor 42. This takes place preferably taking account of the heating power P_HEAT supplied to the exhaust gas sensor 42, an exhaust gas mass flow MA, and the set value T_SENS_SP of the exhaust gas temperature and preferably taking account of a protective cap design of the exhaust gas sensor, a heat transfer from the sensor housing of the exhaust gas sensor 42 to the exhaust gas pipe. For this purpose, a suitable physical model is stored in block B14, which, for example, is implemented as a monitor.

The exhaust gas mass flow MA can preferably be determined as a function of the air mass flow MAF and the set value LAM_SP of the air/fuel ratio.

A block B16 is designed to determine the component temperature T_CAT_SENS of the catalytic converter determined by means of the heating power P_HEAT supplied to the exhaust gas sensor 42. This takes place similarly to the procedure already described using block B4, with the estimated value TEG_CAT input variable of the exhaust gas temperature input variable at the input of the catalytic converter 21 being replaced by the exhaust gas temperature TEG_CAT_IN_SENS determined at the input of the catalytic converter 21 by means of the heating power P_HEAT supplied to the exhaust gas sensor 42.

In a particularly embodiment, the determination of the exhaust gas temperatures in blocks B14 and B16 takes place in a virtual steady operating state of the internal combustion engine. Furthermore, the physical model of block B4 can, for example, be adapted as a function of a deviation of the estimated value TEG_CAT_IN of the exhaust gas temperature at the inlet of the catalytic converter 21 and by means of the exhaust gas temperature TEG_CAT_IN_SENS at the inlet of the catalytic converter 21 determined by means of the heating power P_HEAT supplied to the exhaust gas sensor 42, and thus especially its model parameters. This also preferably takes place with the aid of measured data acquired in the virtual steady operating state of the internal combustion engine. Alternatively, however, the physical model of the block B2 can also be amended correspondingly. In this way, the respective physical model for determining the estimated values of the exhaust gas temperature or of the component temperature can be adapted without an additional need for the use of an extra temperature sensor in the exhaust gas tract and the precision with which the estimated values can be determined can thus be increased.

The invention claimed is:

1. A method for operating an internal combustion engine with at least one cylinder and an exhaust gas tract, in which an exhaust gas sensor, which can be heated in a controlled manner, is arranged, the method comprising the steps of:
    determining an exhaust gas temperature of an exhaust gas flowing in the exhaust gas tract as a function of the heating power supplied to the exhaust gas sensor,
    determining an estimated value of the exhaust gas temperature as a function of a physical model of the combustion of the air/fuel mixture and of the exhaust gas tract as a function of at least one operating variable of the internal combustion engine, but independent of the heating power supplied to the exhaust gas sensor, and
    adapting model parameters of the physical model as a function of a deviation of the estimated value and of the exhaust gas temperature determined by means of the supplied heating power.

2. The method according to claim 1, wherein the exhaust gas temperature of the exhaust gas flowing in the exhaust gas tract is determined as a function of a mass flow flowing through the exhaust gas tract.

3. The method according to claim 1, wherein the exhaust gas temperature of the exhaust gas flowing in the exhaust gas tract is determined in a virtual steady operating state as a function of the heating power supplied to the exhaust gas sensor.

4. The method according to claim 1, wherein a protective function for a component of the exhaust gas tract is implemented as a function of the exhaust gas temperature determined by means of the supplied heating power.

5. A device for operating an internal combustion engine with at least one cylinder and one exhaust gas tract, in which an exhaust gas sensor, which can be heated in a controlled manner, is arranged, with the device being operable
    to determine an exhaust gas temperature of an exhaust gas flowing in the exhaust gas tract as a function of the heating power supplied to the exhaust gas sensor,
    to determine an estimated value of the exhaust gas temperature as a function of a physical model of the combustion of the air/fuel mixture and of the exhaust gas tract as a function of at least one operating variable of the internal combustion engine, but independent of the heating power supplied to the exhaust gas sensor, and
    to adapt model parameters of the physical model as a function of a deviation of the estimated value and of the exhaust gas temperature determined by means of the supplied heating power.

6. The device according to claim 5, wherein the exhaust gas temperature of the exhaust gas flowing in the exhaust gas tract is determined as a function of a mass flow flowing through the exhaust gas tract.

7. The device according to claim 5, wherein the exhaust gas temperature of the exhaust gas flowing in the exhaust gas tract is determined in a virtual steady operating state as a function of the heating power supplied to the exhaust gas sensor.

8. The device according to claim 5, wherein a protective function for a component of the exhaust gas tract is implemented as a function of the exhaust gas temperature determined by means of the supplied heating power.

9. An internal combustion engine comprising:
    at least one cylinder,
    one exhaust gas tract,
    a exhaust gas sensor comprising a heating device arranged in the exhaust gas tract,
    a control device coupled with said gas sensor for determining an exhaust gas temperature of an exhaust gas flowing in the exhaust gas tract as a function of the heating power supplied to the heating device, wherein the control device is operable to determine an estimated value of the exhaust gas temperature as a function of a physical model of the combustion of the air/fuel mixture and of the exhaust gas tract as a function of at least one operating variable of the internal combustion engine, but independent of the heating power supplied to the heating device, and wherein the control device adapts model parameters of the physical model as a function of a deviation of the estimated value and of the exhaust gas temperature determined by means of the supplied heating power.

10. The device according to claim 9, wherein the exhaust gas temperature of the exhaust gas flowing in the exhaust gas tract is determined as a function of a mass flow flowing through the exhaust gas tract.

11. The device according to claim 9, wherein the exhaust gas temperature of the exhaust gas flowing in the exhaust gas tract is determined in a virtual steady operating state as a function of the heating power supplied to the exhaust gas sensor.

12. The device according to claim 9, wherein a protective function for a component of the exhaust gas tract is implemented as a function of the exhaust gas temperature determined by means of the supplied heating power.

* * * * *